United States Patent Office 3,608,399
Patented Sept. 28, 1971

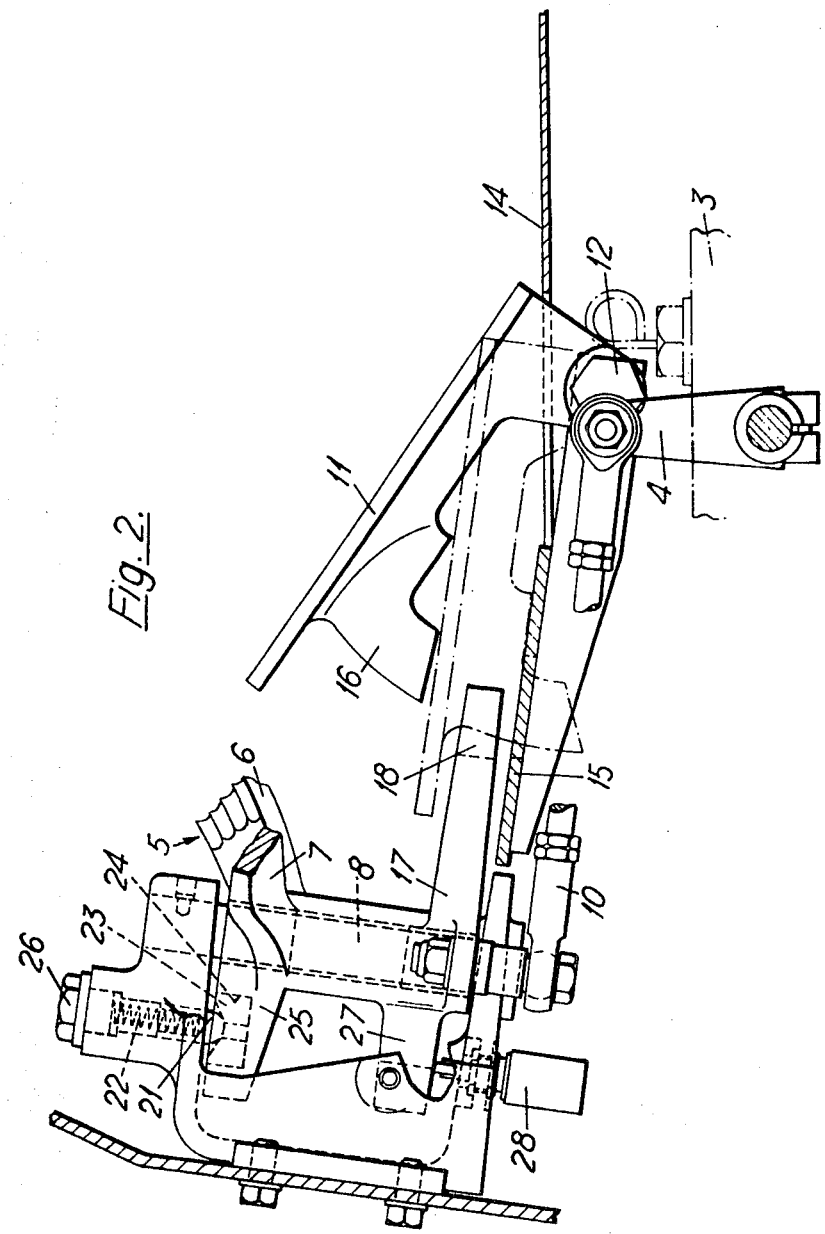

3,608,399
VEHICLE CONTROLS
William Knight, Coventry, England, assignor to Coventry Climax Engines Limited, Coventry, England
Filed Mar. 27, 1970, Ser. No. 23,400
Claims priority, application Great Britain, Apr. 30, 1969, 21,997/69
Int. Cl. B60k 21/00
U.S. Cl. 74—850
6 Claims

ABSTRACT OF THE DISCLOSURE

An industrial truck has a horizontally pivoted accelerator pedal to control the throttle of an I.C. engine by which the truck is powered and a vertically pivoted selector pedal which is linked to a hydraulic torque converter and which has three positions giving forward drive, reverse drive and neutral respectively. A rigid locking piece projects downwardly from the accelerator pedal and, upon movement of the accelerator pedal from an upper limiting position giving idling of the engine, engages a slotted arm which moves with the selector pedal and thereby locks the selector pedal.

---

Figure 1:
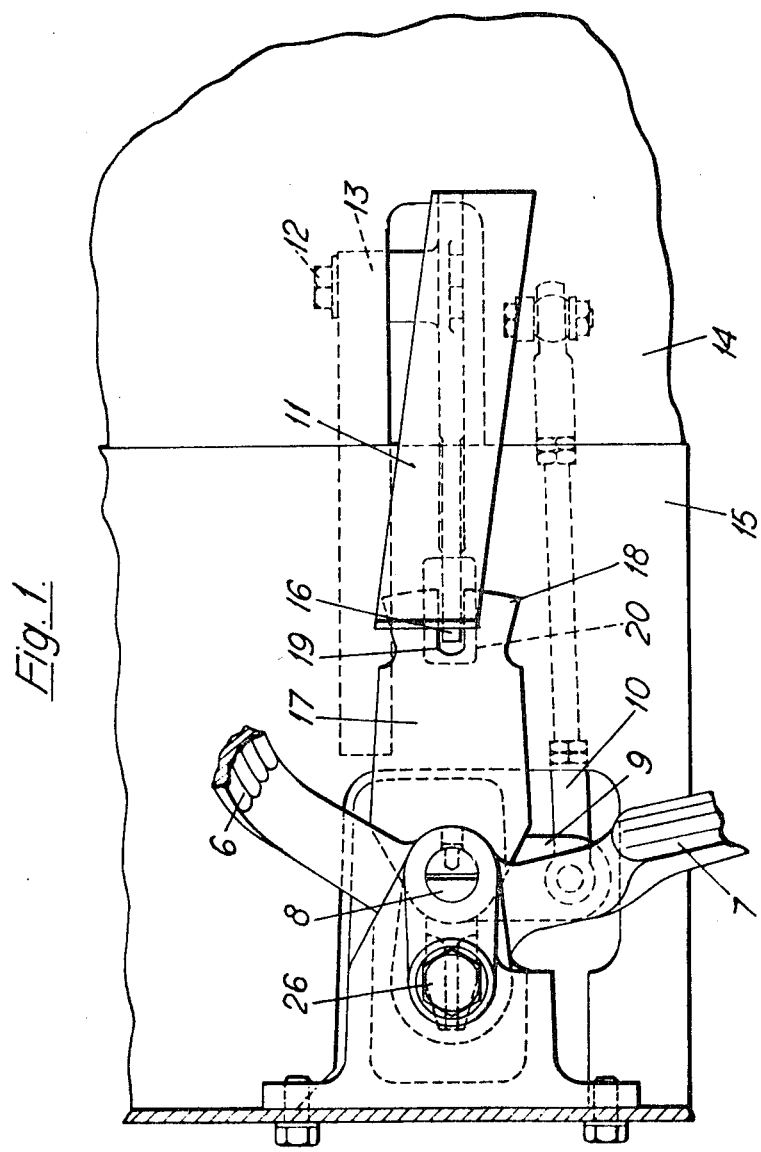

This invention relates to pedal controls for vehicles such as industrial trucks in which it is desirable for an operator both to select forward or reverse drive and to control the speed of a driving motor of the vehicle by means of pedals thus leaving his hands free to operate manual controls for other functions of the vehicles such as lifting apparatus.

In accordance with the invention a vehicle has two pedals, one having at least two positions corresponding to drive and neutral respectively and the other being movable, to control the speed of a driving motor of the vehicle, between a first limiting position corresponding to minimum speed of the driving motor and second limiting position corresponding to a maximum speed of the driving motor, and upon movement of the second pedal away from its first limiting position, a locking piece is arranged to engage and lock a part which moves with the first pedal. In this way movement of the first pedal is only possible when the driving motor is at its minimum speed.

Usually, the first pedal has a third position corresponding to reverse drive.

The first pedal is preferably pivoted about a substantially vertical axis in front of the second pedal which is pivoted about a substantially horizontal axis, the first pedal being arranged to be moved from side to side by the toe of the operator. The locking piece can then project rigidly downwards below the second pedal, and the part which moves with the first pedal can be a plate which is rigid with the first pedal and which extends beneath the locking piece and is formed with a slot into which the locking piece can project when the first pedal is in the position corresponding to neutral, the plate being to one side of the locking piece when the first pedal is in the drive position.

It is most convenient for the operator if the first pedal has two branches one on each side in front of the second pedal. Movement of the operators toe to one side or the other then selects the appropriate drive and the space directly in front of the second pedal is clear so that the operator's toe is unobstructed when operating the second pedal.

One example of pedal controls for an industrial lift-truck is illustrated in the accompanying drawing in which:

FIG. 1 is a plan view of the pedals; and
FIG. 2 is an elevation.

The vehicle is driven by a motor, which in this example is an I.C. engine, through a hydraulic torque converter 3. An actuating lever 4 of the torque converter has a central, neutral position, a forward position on one side of neutral and a reverse position on the other side of neutral. A first pedal assembly 5 has two pedal branches 6 and 7 and is rotatably mounted on a spindle 8 which is inclined slightly rearwardly and upwards. As indicated in FIG. 2 the two branches extend outwards and to the rear at an obtuse angle to one another.

Near the lower end of the spindle 8, the assembly 5 has an arm 9 which extends to one side and is connected to the actuating lever 4 of the torque converter 3 by a pivotal link 10. The central position of the pedal assembly 5 illustrated in FIG. 1 corresponds to the neutral position of the actuating lever 4, and displacement of the pedal branches 5 and 6 to one side or the other moves the actuating lever to its forward and reverse positions respectively.

An accelerator pedal 11 is pivoted on a horizontal bolt 12 on a fixed part 13 of the truck to the rear of the first pedal assembly. The part 13 is supported on a front foot board 15 and a rear foot board 14 is cut away to clear the accelerator pedal. The accelerator pedal 11 has a first limiting position which is illustrated in full lines in FIG. 2 and which corresponds to minimum engine speed. In this position, the front, upper end of the accelerator pedal 11 is roughly level with the pedal branches 5. The accelerator pedal 11 can be rocked downwards about its pivot defined by the bolt 12 against the spring action to a second limiting position which is shown in dotted lines in FIG. 2 and in which it is nearly horizontal. The second limiting position of the accelerator pedal corresponds to maxmum engine speed.

A locking piece 16 forms an integral part of the accelerator pedal 11 and is curved about the axis of the bolt 12 as centre. The spindle 8 of the first pedal assembly carries a plate 17 above the arm 9 and the plate has a rear portion 18 formed with a central open ended slot 19. The rear portion 18 of the plate 17 lies directly below the locking piece 16 which is arranged to be clear of the plate in the upper limiting position of the accelerator shown in full lines in FIG. 2.

When the first pedal assembly is in its central position shown in FIG. 1 corresponding to neutral, the slot 19 accommodates the locking piece 14 when the second pedal is moved away from its upper limiting position, and the first pedal assembly 5 is then locked against movement in either direction by engagement of the walls of the slot 19 with the locking piece 16. A slot 20 is formed in the front foot board 15 to accommodate the locking piece 16 when the accelerator is depressed.

With the accelerator pedal 11 in its upper limiting position, the first pedal assembly 5 can be shifted, by means of a driver's toe, to the forward drive position, and when the accelerator pedal 11 is then moved away from its upper limiting position, the locking piece 16 moves downwards on one side of the plate 18 and thus prevents the first assembly being moved back to the neutral position. Similarly, when the first pedal assembly 5 is in the reverse drive position the plate lies on the other side of the locking piece which again prevents the first pedal assembly from being moved back to neutral.

The assembly 5 is located in its central neutral position by a plunger 21 which is urged by a spring 22 against a dished insert 23 held in a recess 24 in an arm 25 which forms a further part of the assembly 5. The spring 22 is retained by a screw plug 26.

The assembly 5 also includes an arm 27 which engages a switch 28 when the assembly is in its central position and which releases the switch upon movement of the assembly away from the central position. The switch 28 is connected in a starter motor circuit for the engine of the vehicle and prevents the engine from being started except when the torque converter is in neutral.

I claim:
1. In a vehicle a pedal control assembly comprising a first pedal, means mounting said first pedal to said vehicle and adapted to permit movement of said first pedal between at least two positions corresponding to drive and neutral respectively, a second pedal, means mounting said second pedal to said vehicle and adapted to permit movement of said second pedal between a first limiting position corresponding to minimum speed of a driving motor of said vehicle and a second limiting position corresponding to maximum speed of said driving motor, a part operably connected with said first pedal and adapted to move therewith and locking means adapted upon movement of said second pedal away from said first limiting position to engage and lock said part.

2. A vehicle according to claim 1 wherein said mounting means for said first pedal is adapted to permit movement of said first pedal to a third position corresponding to reverse drive of said motor.

3. A vehicle according to claim 2, wherein said mounting means for said first pedal is a pivotal mounting means adapted to permit said first pedal to pivot about a substantially vertical axis, and said mounting means for said second pedal is a pivotal mounting means adapted to permit pivotal movement of said second pedal about a substantially horizontal axis said first pedal being disposed in front of said second pedal and adapted to be moved from side to side by the toe of an operator.

4. A vehicle according to claim 3, wherein said locking means comprises a rigid downward extension from said second pedal and said part adapted to move with said first pedal comprises a plate which is rigid with said first pedal and which extends beneath said locking means, and a slot in said plate adapted to receive said rigid downward projection when said first pedal is in said position corresponding to neutral, said plate being to the side of said downward projection when said first pedal is in said drive position.

5. A vehicle according to claim 3, wherein said first pedal comprises two branches disposed one on each side but forwardly of said second pedal.

6. A vehicle according to claim 1, including a starting circuit for said motor, a switch connected in said starting circuit and adapted to permit starting of said motor only when operated, and a further part operably connected with said first pedal and adapted to move therewith and adapted to engage and operate said switch when said first pedal is in said position corresponding to neutral and to release said switch when said first pedal is moved away from said neutral position.

References Cited

UNITED STATES PATENTS

| | | | |
|---|---|---|---|
| 2,867,132 | 1/1959 | Schroeder | 74—850 |
| 2,968,967 | 1/1961 | Ross, Jr. | 74—850 |
| 3,392,605 | 7/1968 | McLean | 74—878 |
| 3,418,872 | 12/1968 | Vernati | 74—878 |

CORNELIUS J. HUSAR, Primary Examiner

U.S. Cl. X.R.

74—478, 560; 192—.098, 3